United States Patent [19]

Besinge

[11] Patent Number: 4,736,210

[45] Date of Patent: Apr. 5, 1988

[54] MAGNETIC TRANSDUCER INCLUDING A PLURALITY OF HEADS AND METHOD FOR PRODUCING THE MAGNETIC TRANSDUCER

[75] Inventor: Serge Besinge, Valdoie, France

[73] Assignee: Bull S.A., Paris, France

[21] Appl. No.: 919,965

[22] Filed: Oct. 17, 1986

[30] Foreign Application Priority Data

Oct. 23, 1985 [FR] France .............................. 85 15721

[51] Int. Cl.$^4$ ..................... G01D 15/10; G01B 5/127
[52] U.S. Cl. .................... 346/74.5; 29/603
[58] Field of Search .......................... 346/74.5, 13 JL; 360/110, 123, 124, 125, 127; 29/603, 604, 605, 606, 595; 427/48

[56] References Cited

U.S. PATENT DOCUMENTS

| | | | |
|---|---|---|---|
| 3,613,228 | 10/1971 | Cook et al. | 29/603 |
| 3,641,586 | 2/1972 | Woodward et al. | 29/603 |
| 3,657,806 | 4/1972 | Simon | 29/603 |
| 3,678,576 | 7/1972 | Braun et al. | 29/603 |
| 3,881,244 | 5/1975 | Kendall | 29/603 |
| 4,412,379 | 11/1983 | Lemke et al. | 29/603 |
| 4,670,972 | 6/1987 | Sakakima | 29/603 |
| 4,685,014 | 8/1987 | Hanazono et al. | 29/603 |

FOREIGN PATENT DOCUMENTS

| | | | |
|---|---|---|---|
| 52-54407 | 10/1977 | Japan | 29/603 |
| 56-80815 | 9/1981 | Japan | 29/603 |
| 60-1614 | 5/1985 | Japan | 29/603 |

OTHER PUBLICATIONS

Patent Abstracts of Japan, vol. 5, No. 146 (p. 80) (818), Sep. 16, 1981.
IBM Technical Disclosure Bulletin, vol. 25, No. 12, May 1983, pp. 6428-6429-R. A. Scranton et al: "MLC Technology for Print Head Transducers".
PCT:WO 85/02479 (Minnesota Mining and Manufacturing Co).
Patent Abstracts of Japan, vol. 9, No. 116 (p. 357) (1839), May 21, 1985.
Patent Abstracts of Japan, vol. 1, No. 123, (p. 5072 E 77, Oct. 17, 1977.

Primary Examiner—Arthur G. Evans
Attorney, Agent, or Firm—Kerkam, Stowell, Kondracki & Clarke

[57] ABSTRACT

The invention relates to a method for producing a magnetic transducer including a plurality of heads and a transducer produced thereby. The method comprises placing a magnetic core (such as 17-2) provided with a winding (such as E1-2) in each of the grooves (18-1, 18-2, etc.) formed on the face (20) of an insulating wafer, then filling up each groove with the aid of a hardenable nonmagnetic substance, and precision grinding the face (20) such as to sever the portions (22, 23) of the conductors that project above this face and thus causing the appearance of contact dots (24, 25) intended to be connected to an external control circuit.

16 Claims, 9 Drawing Sheets

MAGNETIC TRANSDUCER INCLUDING A PLURALITY OF HEADS AND METHOD FOR PRODUCING THE MAGNETIC TRANSDUCER

FIELD OF THE INVENTION

The present invention relates to a method for producing a magnetic transducer that includes a plurality of heads. Such a transducer is used particularly, but not exclusively, in the field of non-impact magnetic printing machines.

BACKGROUND OF THE INVENTION

Printing machines of this type, like such equipment as magnetic drum memories or magnetic disk units, are used for recording data and include a magnetic recording substrate that takes various forms, such as a drum, an endless belt or a disk, and is covered with a film of magnetic material. Recording data on this substrate is effected by a recording device known as a transducer, which includes one or more magnetic recording heads in the vicinity of which this recording substrate is displaced. Each time each of these heads is excited by an electric current of suitable intensity, it generates a magnetic field which has the effect of creating magnetized domains of small dimensions on the surface of the recording substrate moving past these heads. These domains, which are virtually punctiform, are generally known as magnetized points. The portion of the substrate surface that accordingly passes before each head is conventionally known as the data recording track, and the recording substrate generally includes a plurality of tracks that can be recorded upon either individually in the course of successive recording operations, or simultaneously in the course of a single operation.

To obtain better definition of the magnetized domains or points formed on the recording substrate, it has been proposed that this substrate be magnetized by what is known as "transversal" recording, such that the magnetic induction of each of the domains thus formed is perpendicular to the surface of this substrate. One such mode of magnetization proves to be of particular interest in the case of magnetic printing machines, where to obtain a printed image having high definition, it is necessary to record on the carrier a latent magnetic image that comprises various points that are quite small and quite close together. To record this latent magnetic image, the prior art has made use of a transducer including a plurality of magnetized heads arranged side by side and aligned in a direction that is perpendicular to the direction of displacement of the recording substrate. Each of these heads includes a thin magnetic core on which an excitation winding is wound, which is substantially in the shape of a "U" and is profiled so that it has a relatively narrow recording pole at one end and a relatively large flux closing pole at its other end, the two poles being put in contact with or in immediate proximity to the surface of the recording substrate.

With these heads, perfectly defined magnetized points that are relatively small in size can be obtained on the recording substrate, that is, having a square section on the surface of the substrate that is on the order of 100 to 200 $\mu$m on a side. However, they have the disadvantage that each one includes a core, which must be machined with very high precision during manufacture, if the magnetized points formed by these various heads are to be substantially identical in size. Furthermore, with these heads the time required for forming one magnetized point on the recording substrate is always relatively long, in generally more than six microseconds, which naturally limits the performance of the machine in which these heads are used.

These disadvantages can be overcome by having recourse to recording heads having a magnetic core, provided with an excitation winding, which is in the form of a rod or needle, excitation winding, which is in the form of a rod or needle, each of the cores of these heads having one end disposed at least in immediate proximity to the surface of the recording substrate, these ends being aligned in succession with one another in a direction perpendicular to the direction of displacement of the recording substrate. With these heads, the core of which is easy to manufacture, the time required for recording one magnetized point does not exceed two microseconds. Nevertheless, it has always been difficult to place these heads all on the inside of the same transducer, particularly because the cores are so small in diameter and have such poor rigidity.

This is why, in an embodiment described and shown in French Patent No. 2.228.253, corresponding to U.S. Pat. No. 3,890,623 in which the filamentary cores have a diameter on the order of 0.8 millimeters, this placement of the heads is obtained by first piercing a first series of aligned holes in a first support plate, each hole having a diameter sufficient to engage one of the two ends of a core with a slight amount of play, then inserting each core, provided with its coil, in each of these holes to keep them in place on this first support plate; then piercing a second series of holes in a second support plate such that this second series of holes are located perpendicularly to the holes of the first series, and finally causing the other end of each core to engage the corresponding hole of this second series.

This mode of assembly, which may be used where the magnetic cores are at least 0.5 millimeters in diameter, cannot be used if the magnetic transducer to be produced has heads with magnetic cores of very small diameter, for instance less than 0.1 millimeters. As a result, filamentary magnetic cores, having a very slight diameter, would not have sufficient mechanical rigidity to withstand the various assembly operations described above without becoming deformed thereby.

SUMMARY OF THE INVENTION

The present invention proposes a method with which a magnetic transducer including a plurality of heads with filamentary magnetic cores can be realized, even in the case where these cores have a very small diameter, that is, less than 0.5 millimeters.

More specifically, the present invention relates to a method for producing a magnetic transducer adapted for recording and/or reading data on a magnetic substrate, this transducer including at least one row of p magnetic heads, each of these heads comprising an elongated magnetic core provided with an exciting winding, this method being characterized by the steps of:

forming at least one winding of insulated conductor wire on each magnetic core;

providing at least one support block of nonmagnetic material, having a series of p grooves on one of its faces, each of said grooves having dimensions sufficient to permit accommodating in it a magnetic core provided with its winding;

placing each of the cores so provided into each of said grooves, such that the non-wound portions of said conductor wires project above said face;

completely filling said grooves provided with these cores with the aid of a hardenable nonmagnetic substance;

precision grinding said face, after hardening of this substance, such as to sever said portions of said conductors projecting above said face and thus causing contact dots to appear, comprising the ends of the windings embedded in this hardened substance, these contact dots being intended for permitting the connection of these windings with an electrical control circuit.

The present invention also relates to a magnetic transducer produced by the foregoing method and more specifically to a magnetic transducer for recording and-/or reading data on a recording substrate (12), this transducer including at least one row of p magnetic heads (T1, T2, T3, etc.), each of these heads comprising an elongated magnetic core provided with an exciting winding, said transducer being characterized in that it includes: 10 - at least one support block (such as 19-1) of nonmagnetic material, including on one (20) of its faces a series of p grooves (18-1, 18-2, . . . , 18-p), each of these grooves encompassing a magnetic core (such as 17-1) surrounded by at least one winding (such as E1-1) of insulated conductor wire, this core and this winding being accommodated entirely in this groove and being embedded in a nonmagnetic substance filling this groove, this winding having, in addition to its wound portion, two nonwound portions (22, 23) terminating in two ends which being comprise two contact dots (24, 25) flush with said face (20) of the support block;

at least one card (27), one edge (33) of which is fixed against said support block, this card being equipped with a printed circuit (29) and components (28) that are part of an electric control circuit (11), this printed circuit being configured to have contact zones (30, 31) along said edge (33); and connections (36) arranged to electrically connect said contact zones (30, 31) with the contact dots (24, 25) of said support block.

The invention also relates to a magnetic transducer for recording and/or reading ddata on a recording substrate (12), this transducer including at least one row of p magnetic heads (T1, T2, T3, etc.), ech of these heads comprising an elongated magnetic core provided with an exciting winding, said transducer being characterized in that it includes:

at least one support wafer (37-1), of nonmagnetic material, including on one of its faces (20) on a zone extending along one of its edges (55), a series of p grooves (18-1, 18-2, . . . ,18-p), each of these grooves encompassing a magnetic core (such as 17-1) surrounded by at least one winding (such as E1-1) of insulated conductor wire, this groove and this winding being accommodated entirely inside this groove and being embedded in a nonmagnetic substance filling this groove, said winding having, in addition to its wound portion, two non-wound portions (22, 23) terminating at two ends which comprise two contact dots (24, 25) flush with said face (20), this support wafer being equipped, on its face (20) but outside the zone of said grooves, with a printed circuit (such as 129-1) and components (28) that are part of an electrical control circuit (11), this support wafer further including connections such as (63-1, 64-11, 64-12, . . ., 64-p) arranged so as to connect said printed circuit with said contact dots (24, 25).

BRIEF DESCRIPTION OF THE DRAWINGS

The invention will be better understood and further objects and advantages thereof will become more apparent from the ensuing description, given by way of non-limiting example and taken in conjunction with the accompanying drawings, wherein:

FIGS. 1A–1J show the various phases in a first embodiment of the method of production, by which a magnetic transducer can be, obtained according to the invention;

DESCRIPTION OF THE PREFERRED EMBODIMENTS

Figure 3:
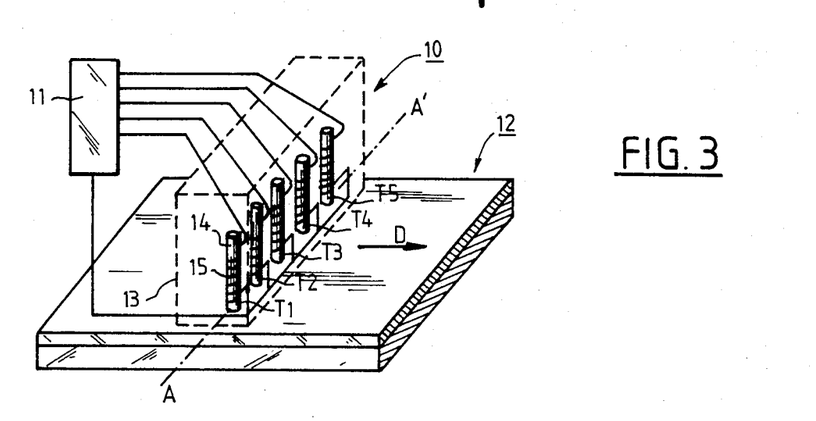
FIG. 3 is a schematic view showing the respective disposition of the magnetic heads with which a magnetic transducer capable of being produced by the method according to the invention is equipped.

In FIG. 3, in highly schematic fashion, a magnetic transducer 10 has been shown which receives electrical signals representing data furnished by a control unit 11 and performs the recording of these data in the form of magnetized zones on a magnetic recording substrate 12, It should be noted, however, that although this transducer is used here to record signals, this same transducer may also serve to detect the presence of magnetized zones recorded on the magnetic recording substrate, in order to convert them into electrical signals. Such a transducer, which enables recording or reading of data on a magnetic substrate, typically includes a plurality of magnetic heads T1, T2, T3, etc., which as shown in FIG. 3 are mounted on the interior of a support block 13; the assembly comprising these magnetic heads and this support block is ordinarily known as a module. These heads, which are of the type that have also been described in the French patent application published as No. 2.228.253 and in U. S. Pat. No. 3,301,948, each include a magnetic core 14 in the shape of a needle, comprising soft magnetic material such as the iron-silicon alloy containing approximately 4% silicon, for example, and this core is surrounded by a winding 15 that can be selectively excited by the electrical signals furnished by the control unit 11. Thus as may be seen in FIG. 3, the cores of the different heads T1, T2, T3, etc., are located side by side, perpendicular to the surface of the recording substrate 12, and their lower ends are aligned in a direction AA' which parallel to the surface of the substrate 12 forms an angle of other than zero with the direction of displacement D of this substrate. In the exemplary embodiment shown in FIG. 3, this direction AA' is perpendicular to the direction of displacement D.

Although for reasons of simplification only five magnetic heads T1-T5 have been shown in FIG. 3, it is understood that the number of magnetic heads of the transducer 10 may be different from that shown in the drawings. It shoulo be noted that in the preferred exemplary embodiment to be described more fully below, the transducer includes at least one row of 256 magnetic cores all aligned in the same direction AA'; each core has a diameter practically equal to 70 microns, and these cores have a center-to-center spacing substantially equal to 212 microns. Under these conditions, by exciting the windings wound upon these cores for a brief instant, practically punctiform magnetized zones can be obtained on the recording substrate 12, these zones being distributed in a direction parallel to the direction AA' and spaced apart by an interval of 0.212 mm. However, as will be explained below, it is possible to obtain punctiform magnetized zones on the recording substrate 12 that are distributed at even smaller intervals, by providing at least one other row of magnetic heads in the transducer 10, in addition to the row of magnetic heads aligned along the direction AA', this other row being aligned in a direction parallel to the direction AA' but offset by a fraction of a spacing interval with respect to the magnetic heads of the first row.

In the embodiment shown in FIG. 3, the circuits 11 tht control the excitation of the windings of the various heads T1, T2, etc., are all accommodated on the exterior of the module 10. However, it should be noted that this embodiment is not exclusive in the present invention and that as will be learned below, a portion of these circuits may be located on the interior of the module.

Figure 1A:
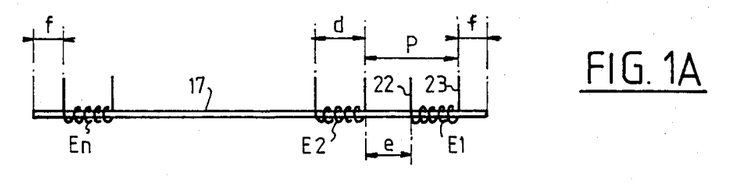

Referring now to FIGS. 1A-1J, the successive phases in a first exemplary embodiment of the method according to the invention, with which a magnetic transducer of the type schematically shown in FIG. 3 can be obtained, will now be described. To perform this method, a plurality of wires made of soft magnetic material are required, these wires being intended to comprise the various cores of the magnetic heads of the transducer, as will be described below. In FIG. 1A, one of these wires, identified by reference numeral 17, has been shown. The soft magnetic material that has been preferentially selected to comprise each of these wires in the exemplary embodiment shown is an iron-nickel alloy which is industrially produced by the company known as Societe Metallurgique d'Imphy under the trade name of "Anhyster DS"; this alloy contains 50% nickel and 50% iron. Nevertheless, it should be understood that this material is not exclusive to the invention, and that each wire 17 may be embodied of any other soft magnetic material. A number n, at least equal to 1, of identical windings E1, E2, ..., En is then formed on each of these wires. In the case where a plurality of windings are formed on the same wires 17, these windings are regularly spaced over the entire length of the wire. It the example described it is assumed that each wire 17 has a diameter of 70 microns and a length equal to 51 millimeters. In FIG. 1A, the length of each winding is represented by the symbol d; e represents the spacing btwteeen two adjacent windings; f is the distance betwen the first winding E1 and the end of the wire 17 closest to this winding; and P is the spacing interval by which the n windings E1-En are distributed over the length of the wire 17. The conductor wire used for each of these n windings in the example described is an insulated copper wire having a diameter equal to 40 microns. It is assumed in the example described that each winding includes 30 turns wound in a single layer, such that the length d of each winding is then equal to 1.2 mm. In the example described, the spacing e between two adjacent windings is equal to 1.85 mm, and the number n of windings thus formed on the wire 17 is equal to 16. Finally, in the example described, the distance f that separates the winding E1 from the end of the wire 17 closes to this winding, like that separating the winding En from the other end of this wire, is practically equal to 2 mm. The coil of these windings on each wire 17 can be embodied in some other manner, for example by using a coil winding machine of a known type. The length of the conductor wire used to form each of these windings is such that, as shown in FIG. 1A, this wire has not only a wound portion comprising the winding per se, but also two non-wound portions 22 and 23.

Figure 1B:
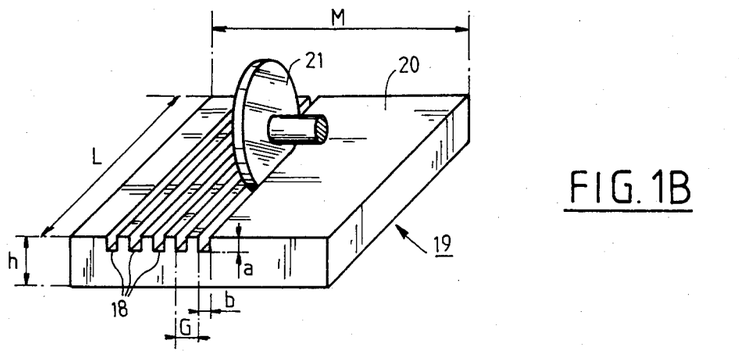

In the method of the invention, a support element 19 of nonmagnetic material is also provided, which as shown in FIG. 1B has a series of p grooves 18 on one 20 of its faces; each groove 18 is intended to receive one of the wires 17, and each of these wires is provided with its n windings E1-En. In the exemplary embodiment shown in FIG. 1B, where this support element comprises a wafer of parallelepiped shape, the thickness h of which is quite small with respect to the other two dimensions L and M of this wafer, these grooves 18 are formed by slicing or grinding, making a series of notches on one large face 20 of this wafer with the aid of a suitable tool such as a grinding wheel 21; the notches all extend parallel to one of the sides, having the length L, of this face 20, and the depth a and width b of these notches are sufficiently large that each notch is capable of serving to accommodate one wire 17 along with its windings E1-En. Thus in the example described, each of these notches or grooves has a depth practically equal to 190 μm and a width practically equal to 170 μm. The wafer 19 on which the grooves are formed has the following dimensions, in the example described:

M=60 mm; L=51 mm; h=320 μm.

Thus as can be seen in FIG. 1B, the grooves 18 are made at regular intervals on the face 20 of the wafer 19, parallel to the side of this wafer having the length L. In the example described, it is assumed that the spacing interval G by which the grooves are distributed over the surface 20 is equal to 212 μm, and that the number p of grooves so formed is equal to 256.

The formation of grooves 18 of the support element 19 can be effected differently from that described above. Thus if the nonmagnetic material comprising the support element 19 were formed of a material capable of being molded, these grooves could be formed at the moment this support element is made, by casting in this manner in a suitably shaped mold.

The material comprising the support element 19 is a non-agnetic material; this material could be either a nonmagnetic metal material such as aluminum or copper, or an insulating material such as glass, silica or an epoxy resin.

Figure 1C:
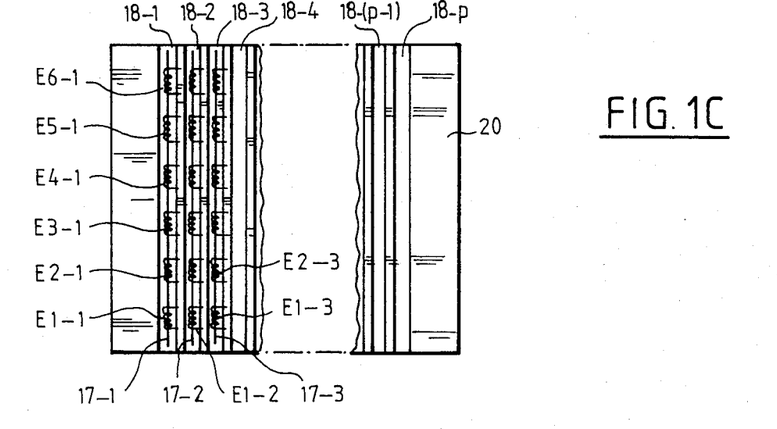
Figure 4:
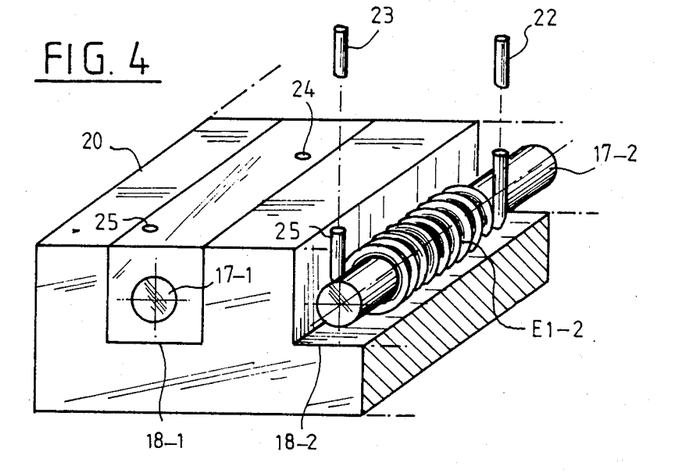
FIG. 4 is a view on a larger scale showing certain details relating to the phases shown in FIGS. 1C, 1D and 1E.

As shown in FIG. 1C, a wire 17 provided with its n windings E1-En is now placed in each of the grooves 18 of the wafer 19. In FIG. 1C, for the sake of convenience, the various grooves 18 are identified by a suffix numer indicating the sequential order of the grooves from left to right in the drawing. In this same drawing figure, numerals 17-1, 17-2, 17-3, etc. represent the wires placed respectively in the grooves 18-1, 18-2, 18-3, etc. The windings formed on these wires have similarly been identified in this drawing figure by the numerals E1, E2, ..., En, followed by the same suffix number as that of the wire 17 that carries it. In FIG. 1C, for the sake of simplification, only six windings have been shown on each of the wires 17-1, 17-2, 17-3, etc.; however, it will be understood that the number of windings on each wire may be different from that shown in FIG. 1C and that in the example described each of these wires includes 16 windings identified as E1-1, E2-1, ..., E16-1 for the wire 17-1, and E1-2, E2-2, ..., E16-2 for the wire 17-2, and so forth. Thus as may be seen in FIG. 1C, the wires 17-1, 17-2, 17-3, ... are placed in the respective grooves 18-1, 18-2, 18-3, such that all the windings E1 of these wires (that is to say, the windings E1-1, E1-2, E1-3, etc.) are in alignment along a direction that is perpendicular to the direction of the grooves. Moreover, the placement of the wires in the grooves is effected in such a manner that the non-wound portions of insulated conductor wire that has served to form each winding projects above the face 20 of the wafer 19. This disposition is shown more clearly in FIG. 4, where a portion of the wire 17-2 has been shown on a larger scale after having been placed in the groove 18-2; this is the portion provided with the winding E1-2. It is now apparent from FIG. 4 that the two non-wound portions 22 and 23 of the insulated conductor wire that has been used to form the winding E1-2 project above the face 20 of the wafer, these two portions extending along a direction perpendicular to this face.

Figure 1D:
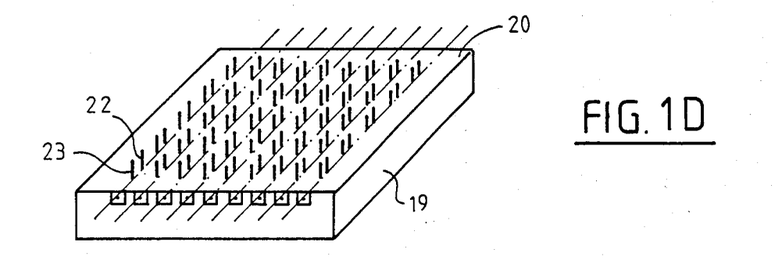

The wires 17 provided with their windings may be placed in the grooves 18 either manually or preferably with the aid of an automatic insertion machine of a suitable type. Once this placement has been completed, the grooves 18 are completely filled with the aid of a hardenable nonmagnetic insulating substance. By way of example this substance may be the product of mixing a hardener with the resin described in French patent No. 2.098.620 corresponding to U.S. Pat. No. 3,775,358. Once this operation has been completed, and after this substance has hardened, the wafer 19 has the appearance shown in FIG. 1D. Now that the grooves 18 have been completely filled, the face 20 of the wafer 19 appears practically flat; the only elements extending above its surface are the non-wound portions 22 and 23 of the windings, these latter however being embedded in the hardened substance. The face 20 of the wafer 19 is now subjected to a precision grinding or finishing operation, the purpose of which is to make this face perfectly flat and thus to sever the portions 22 and 23 that protrude beyond this face. Thus as will be understood by referring to FIG. 4, in which the groove 18-1 has been shown in the state it is in once this operation has been completed, severing of the portions 22 and 23 has the effect of causing contact dots 24 and 25 to appear on the face 20, which comprise the ends of the windings embedded in the hardened substance and are intended to be connected, as will be described below, to a control circuit provided for selective control of the excitation of the various heads.

Figure 1E:
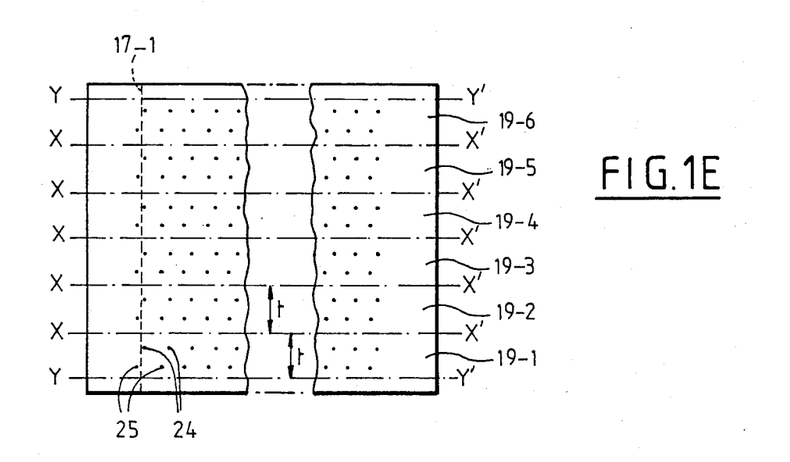

Once this operation is finished, the wafer 19 is subjected to electrical monitoring, comprising connecting the two contact dots 24 and 25 of one winding to a current source to verify, by passing the electric current through this winding, whether the consequtive turns of this winding have not been cut or damaged in the course of the precision grinding operation. After that, the wafer 19 is sliced apart, for instance by means of a diamond saw, into n successive blocks having the same width t, n being the number of windings formed on each magnetic wire 17. As may be seen in FIG. 1E, this cutting is performed along the cutting lines XX' perpendicular to the direction of the magnetic wires 17, and each cutting line is equidistant from the contact dots 24 of one block and from the contact dots 25 of the next block. In the example described, thee cutting is effected with a diamond saw capable of forming a severing line of very slight width, that is, no wider than 50 $\mu$m. Taking into account the values given above for the length d of each winding and the spacing e between two consecutive windings on the same magnetic wire 17, each of the blocks produced by the cutting has a width t which in the example described equals 3 mm. It may also be noted that from the value given above for the length L of the wafer 19, the two end blocks, such as those identified as 19-1 and 19-6 in FIG. 1E, that are produced by cutting this wafer along the cutting lines XX' have a width greater than that of the other blocks. These two end blocks are therefore cut once again along the cutting lines YY' parallel to the lines XX', so as to make these two end blocks the same width as the others.

Figure 1F:
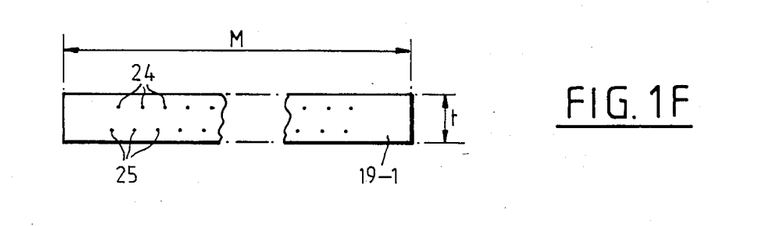

The operation of cutting the wafer 19 into n blocks has the effect of dividing each magnetic wire 17 into n portions, each provided with a winding, and each of these portions thus forms a magnetic core belonging to a magnetic head. Given that as noted above the number of magnetic wires placed in the wafer 19 is equal to p, teach of the n blocks produced by cutting this wafer thus includes p magnetic cores, and each of these cores is provided with an exciting winding. One of these blocks has been shown by way of illustration in FIG. 1F.

Figure 1G:
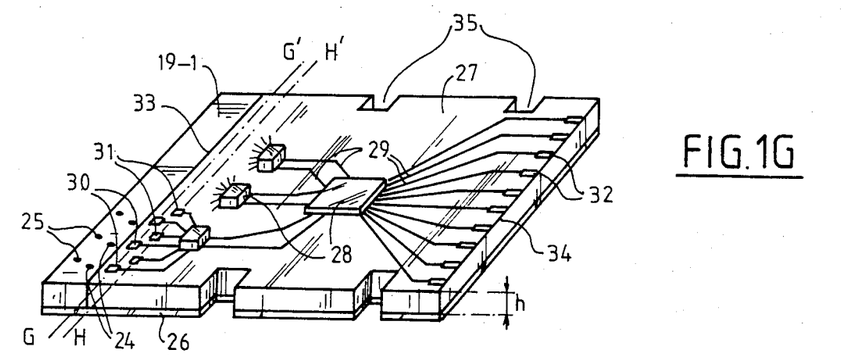

One this cutting operation has been completed, one of the thus-obtained blocks, for example block 19-a, is placed as shown in FIG. 1G on a fine foil 26 of nonmagnetic material; then, after this block has been fixed on this foil along one of its edges, a connection card 27, conventionally known as a substrate, is attached to the block. This card, provided with a logic control unit comprising electronic components 28, is fixed in turn on the foil 26 against one of the longitudinal edges of the block 19-1. This logic control unit is part of the control unit 11 mentioned above. The foil 26, which is intended to facilitate assembling the block 19-1 and the card 27, is made of flexible insulating material in the example described, such as that sold commercially under the trade name Mylar ™; this foil is very thin; in the example described its thickness is practically equal to 0.02 mm. The connection card 27 is formed of a rigid rectangular plate of insulating material, provided on one of its faces with a printed electrical circuit 29 which assures the indispensable connections between the various electronic components 28 mounted on this card and between the components and the contact zones 30, 31 and 32 with which this card is provided. The insulating material comprising this plate 27 may be a hard organic resin, such as a polycarbonate, or any other material having an elevated electrical resistivity, such as alumina. It should also be pointed out that this card 27 has a thickness on the same order of magnitude as that of the block to which it is attached. Thus in the exemplary embodiment shown in FIG. 1G, the block 19-1 and the card 27 have practically the same thickness h. Moreover the dimension of the card 27 along a direction parallel to its edge 33 that touches the block 19-1 is practically equal to the length M of this block, a length which in the example described is equal to 60 mm.

It should also be pointed out that the number of contact zones 30 on the card 27 quals that of the contact zones 31 on this card, and that the total number of these zones 30 and 31 is equal to the total number of contact dots 24 and 25 of the block 19-1. Thus one contact dot of the block 19-1 corresponds with each contact zone of the card 27. Thus as FIG. 1G shows, the contact zones 30 and 31 are ocated near the edge 33 of the card 27 that is located against the block 19-1, the contact zones 30 being aligned along a direction GG' parallel to this edge 33 and the contact zones 31 being aligned along a direction HH' that is parallel to the direction GG' and to the edge 33. The contact zones 32 are disposed along the edge 34 of the card, which as shown in FIG. 1G is oppossed to the edge 33 of this card. As may also be seen in FIG. 1G, the card 27 and the foil 26 are provided on their other two edges with recesses 35 for enabling the passage of fixation elements, which are put into place during the final phase in the assembly of the transducer, as will be explained below.

Figure 1H:
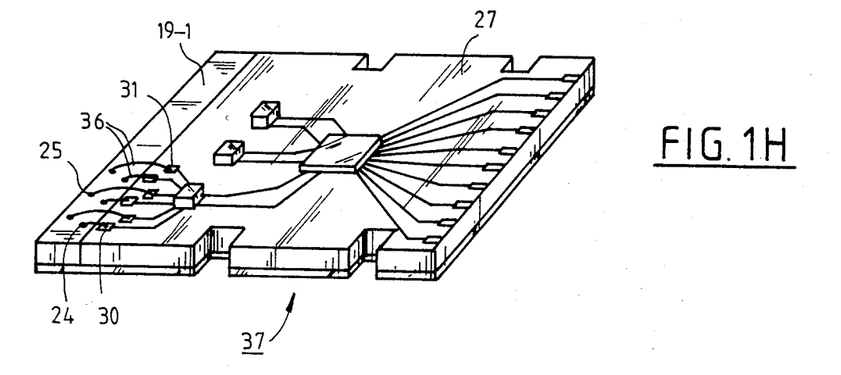

When the operation of assembling the block 19-1 of the card 27 and the foil 27 has been completed, the electrical connections between the contact dots 24 of the block 19-1 and the contact zones 30 of the card 27, on the one hand, and between the contact dots 25 of this block and the contact zones 31 of this card, on the other, are then made as shown in FIG. 1H. These connections are effected by means of conductor wires 36 such that each of these contact zones is connected to the corresponding contact dot. This operation may be performed manually or, preferaby, entirely automatically with the aid of a suitable wiring machine of a known type. The resultant unit once this wiring operation has been completed has been shown schematically in FIG. 1H, where it is identified by reference numeral 37.

It will be useful to recall now that the magnetic heads that are incorporated on the inside of each of the blocks 19-1, 19-2, etc. and each of which comprises a magnetic core provided with a winding are distributed in each block spaced apart by an interval G, which in the example described is equal to 212 $\mu$m. In the case where the object is to use these blocks to produce a magnetic transducer capable of forming punctiform magnetized zones on a recording substrate that are spaced apart by an interval of 106 $\mu$m, two units are then used, each analagous to that shown in FIG. 1H, and they are placed back to back as shown in FIG. 1I; in this last drawing figure, these two units are identified by reference numerals 37-1 and 37-2.

Figure 1I:
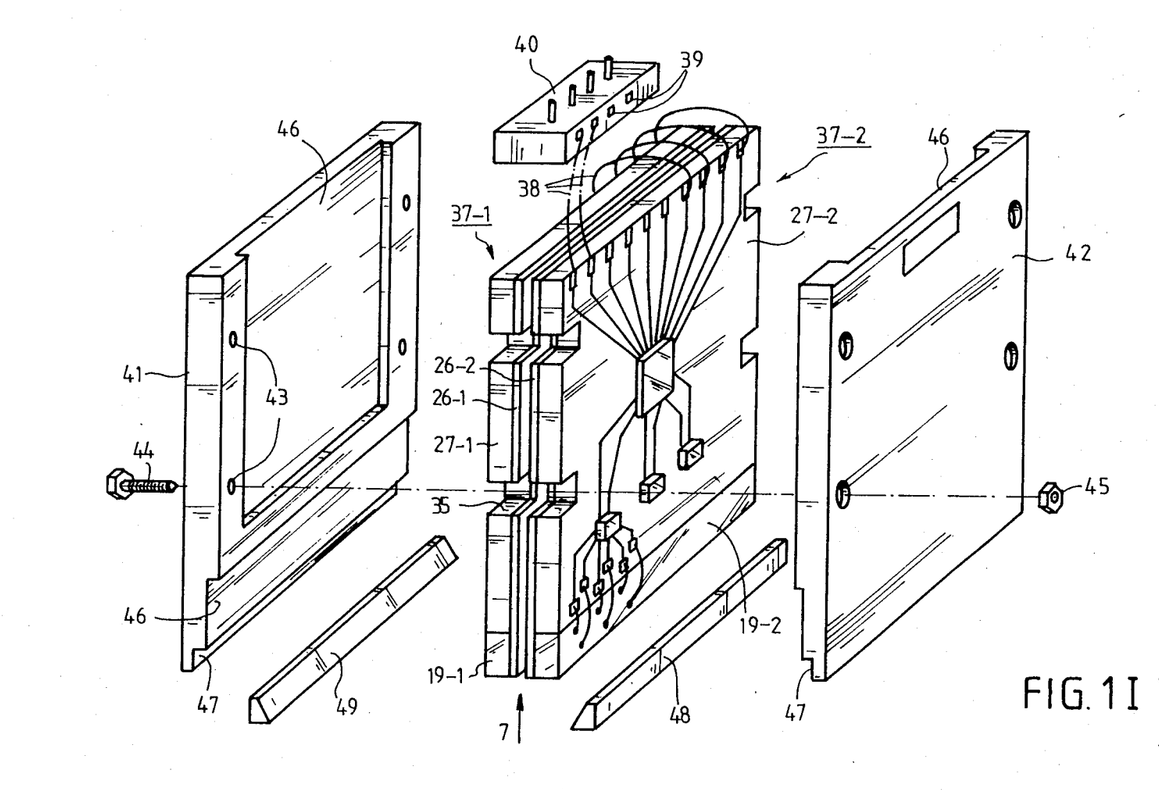
Figure 7:
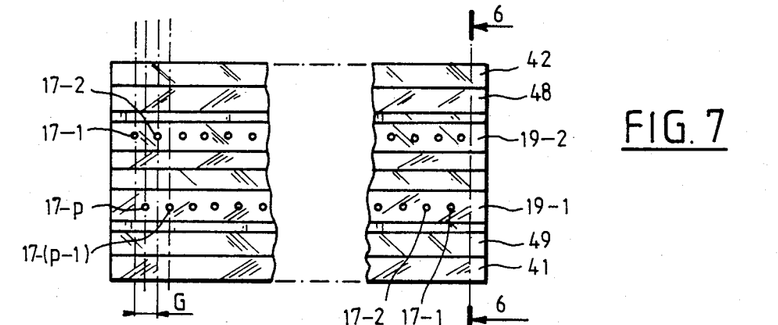
FIG. 7 is a view of the lower surface of the transducer shown in FIG. 1J.

In FIG. 1I, the constituent elements of the two units 37-1 and 37-2 have been identified by the same reference numerals as those used for the analagous elements of FIG. 1H, but followed by the number 1 for the elements comprising unit 37-1 and the number 2 for the elements comprising unit 37-2. It should also be noted here that during the operation of assembling each of these two units, the blocks 19-1 and 19-2 of these units are positioned relative to their respective cards 27-1 and 27-2 in such a way that when these two cards are placed back to back, one being superimposed on the other as shown in FIG. 1I, the cores 17-1, 17-2, etc. of the block 19-1 are offset by a one-half spacing interval with respect to the cores 17-1, 17-2, etc. of the block 19-2, as shown in FIG. 7. Once the two units 37-1 and 37-2 are placed back to back and kept superimposed on one another, the electrical connections necessary for selectively exciting the various magnetic heads of the transducer are then effected; this operation comprises connecting the contact zones 32 of the card 27-2 via flexible conductors 38 to either the contact zones 32 of the card 27-1 or the contact terminals 39 of a connector 40 intended to permit later connection of the transducer to an external control circuit; all the connections are made in accordance with the wiring diagram arranged for controlling this selective excitation of the heads. After that, two rigid caps 41 and 42 are placed on both sides of the assembly thereby obtained, each cap being provided along two of its opposite sides with holes 43 intended for being engaged by fixation elements. While keeping this assembly between these two caps, fixation elements are then introduced into these holes 43, for example comprising bolts 44 and screws 45 that pass through the recesses 35 made in the cards 27-1 and 27-2; then the entire assembly is locked in place by these fixation elements, so that a rigid and non-deformable structure is obtained, hereinafter called a module. To prevent deterioration of the electronic components 28 implanted on the cards of the units 37-1 and 37-2, on the one hand, and of the conductor wires 36 on the other, the caps 41 and 42 have indentations 46 machined in such a manner as to leave enough space to accommodate these wires and these components when these two units 37-1 and 37-2 are spaced close together between these two caps. FIG. 1I again shows that the caps 41 and 42 each have a notch 47 formed along their edge located vertically with respect to each of the blocks 19-1 and 19-2; each of these two notches serves as a means of fixation, by some appropriate means such as gluing, of one of two shoes 48 and 49 intended to come into contact later with the surface of a magnetic recording substrate and thus to permit the ends of the magnetic cores embedded in the interior of the blocks 19-1 and 19-2 to remain out of contact with this surface but in immediate proximity thereto. These two shoes 48 and 49 are embodied in some other material that has a low coefficient of friction and a low coefficient of thermal expansion. In the example described, these shoes are thus made of a polyimide resin into which graphite particles have been incorporated.

Figure 1J:
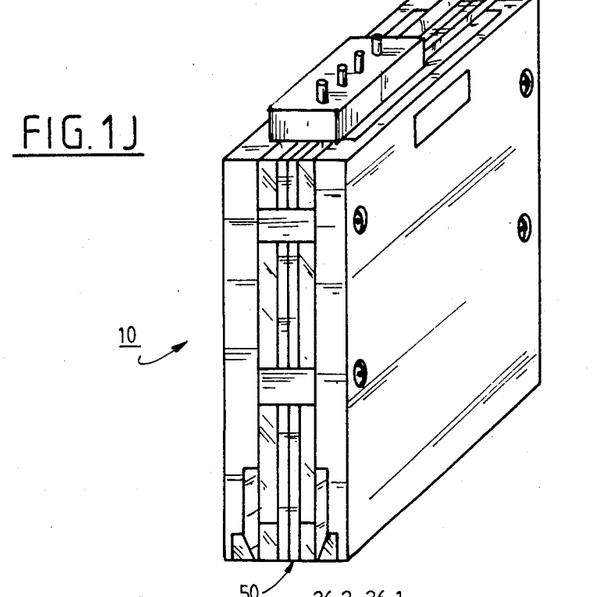
Figure 6:
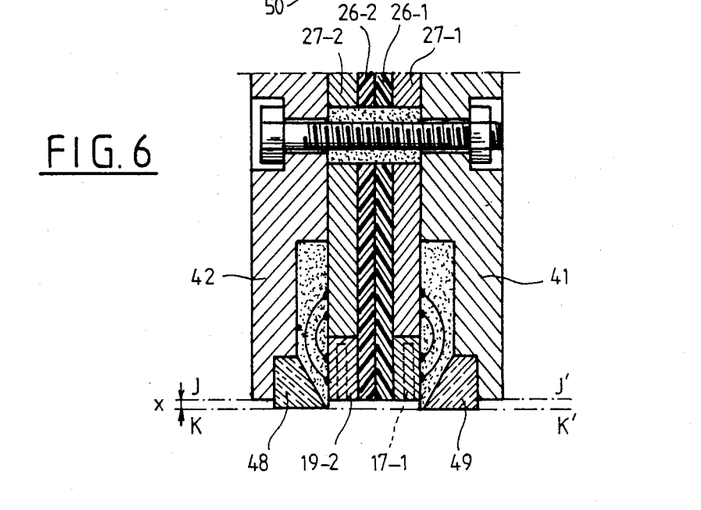
FIG. 6 is a sectional view of a portion of the transducer shown in FIG. 1J.

The module obtained once all these operations have been completed is now subjected to duplicate molding, in which a hardenable insulating resin is poured into the indentations 46 of the caps 41 and 42 and into the recesses 35; not only does this assure excellent insulation of the electrical circuits located in these recesses, but it further reinforces the mechanical regidity of the module. Once these indentations and recesses have been filled in this way, the module appears as shown in FIG. 1J. After that, this module 10 is subjected to a precision grinding operation on the face 50 on which the ends of the magnetic cores appear; as shown in FIG. 6, this is effected over the portions of this face located outside the two shoes 48 adn 49. This precision grinding makes it possible to put these portions into a plane JJ', which is parallel to and offset from the plane KK' that passes via the friction faces of the shoes 48 and 49. It should be pointed out that the spacing x that separates these two planes is always very small. Thus in the example described this spacing has a value practically equal to 20 microns. Once this precision grinding operation is completed the module is subjected to monitoring, to verify that the electrical circuits it includes are functioning properly, and then it can be put into place in the data recording equipment for which it is intended.

Figure 2A:
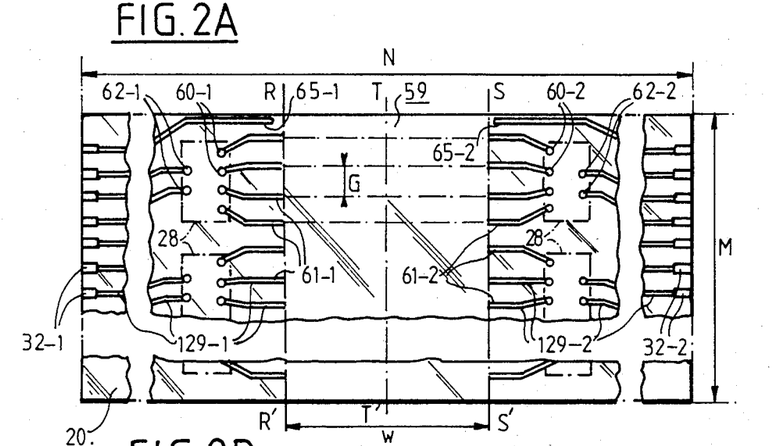
FIGS. 2A-2H show various phases in a second embodiment of the method of production by which a magnetic transducer can be obtained according to the invention.

The module 10 shown in FIG. 1J may also be embodied in another way as well, which will now be described, referring in particular to FIGS. 2A–2H. This embodiment is based on a support block 59, as shown in FIG. 2A, which takes the form of a rigid rectangular wafer made of insulating material, such as alumina; the thickness h of this wafer is very small compared to its other dimensions M and N. In the example shown, it is assumed that this wafer has the following dimensions:

M=60 mm; N=80 mm; h=320 μm.

Thus as shown in FIG. 2A, this wafer 59 is provided on one 20 of its faces with two groups 129-1 and 129-2 of printed electrical circuits; the configuration of the conductors of group 129-1 is symmetrical to that of the conductors of group 129-2 with respect to a plane of symmetry perpendicular to this face and extending along the median axis TT' of the wafer 59. This axis TT' is parallel to the edges having the dimensions M of this wafer. These two groups of circuits are separated from one another by a central region defined by two axes RR' and SS' that are parallel to the axis TT' and are spaced apart from one another by a distance W which in the example described is equal to 8 mm. The conductors that each comprise the two groups of circuits are essentially distributed in different categories. Thus the conductors belonging to the first of these two categories ar those which as seen in FIG. 2A have one of their ends located on one or the other of the two axes RR' and SS'. These conductors, which terminate at connection terminals 60-1 and 60-2 of the wafer 59, are arranged such that in the vicinity of one or the other of the axes RR' and SS' they have rectilinear portions, which are called conductive strips and are identified by reference numeral 61-1 for the conductors of group 129-1 and reference numeral 61-2 for the conductors of group 129-2; they are parallel to one another and are oriented in a direction perpendicular to the axis TT'. These conductive strips are uniformly distributed at a spacing interval G which in the example described equals 212 μm. The other conductors, which belong to the second category in each of the groups 129-1 and 129-2 are arranged to assure the connections between the other connection terminals 62-1 and 62-2 and the contact zones 32-1 and 32-2 with which the wafer 59 is provided; the contact zones 32-1 and 32-2 are arranged along each of the two edges having the length M of this wafer, as shown in FIG. 2A. The connection terminals 60-1, 60-2, 62-1 and 62-2 are intended to permit later assembly of electronic components 28 on the wafer 59; these components are symbolically represented by dot-dash lines in FIG. 2A. Aside from the two categories of conductors just described, each of the groups 129-1 and 129-2 includes another conductor, called a reverse conductor, which is identified by one of the reference numerals 65-1 and 65-2 and as will be described below is intended to assure the reversal of the excitation current of the various magnetic heads.

Given that the configuration of the conductors of group 129-1 is symmetrical to that of the conductors of group 129-2 with respect to the plane of symmetry extending along TT', there are as many conductive strips 61-2 on the wafer 59 as there are conductive strips 61-1; in the example described, the number p of conductive strips 61-1 is equal to 256. Furthermore, each of the conductive strips 61-2 is located in the extension of the conductive strip 61-1 to which it is symmetrical.

Figure 2B:
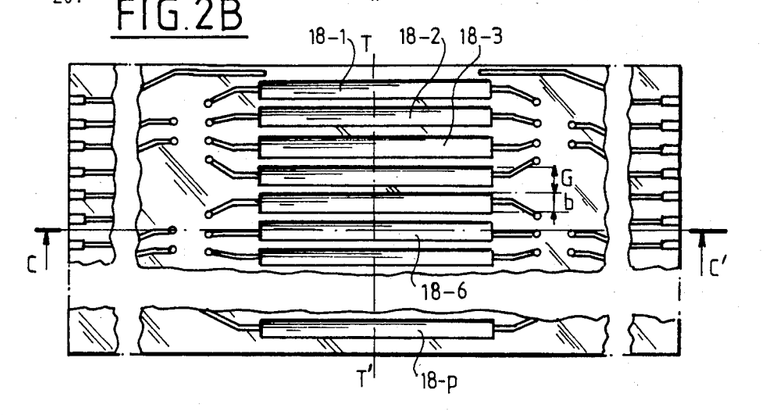
Figure 2C:
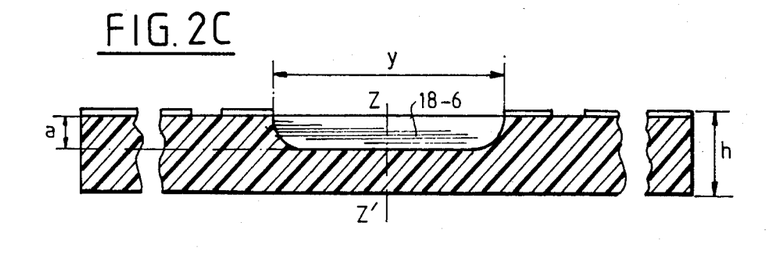

On the wafer 59 comprises as described, a series of p grooves 18-1, 18-2, ..., 18-p is now produced, as shown in FIG. 2B and oriented perpendicular to the axis TT'; these grooves are uniformly distributed at a spacing interval G, and each of the grooves extends between two conductive strips located in the extension of one another. In FIG. 2C, which is a sectional view through the wafer 59 taken along a sectional line CC' of FIG. 2B, one of these grooves has been shown. It should be noted here that to make the drawing clearer, the spacing interval G among the conductive strips and the grooves, and the dimensions of these grooves, have not been shown on the same scale in FIGS. 2A, 2B and 2C. In the example described, it is assumed that the spacing interval G of the grooves equals 212 μm and that each groove has a length equal to 10 mm, a width b equal to 170 μm, and a depth a equal to 190 μm. Furthermore, although in the example described these grooves are formed by grinding of the face of the wafer 59 that is provided with the two groups 129-1 and 129-2 of printed circuits, these grooves may be made differently. For example, if the insulating material comprising the wafer 59 is embodied by a thermosettable resin, these grooves may be made at the moment this wafer is produced, when this resin is cast in a mold of suitable shape. In that case after this resin has hardened the wafer 9 has to undergo familiar deposition operations, so as to be equipped with the two groups of printed circuits.

Figures 2D, 2E:
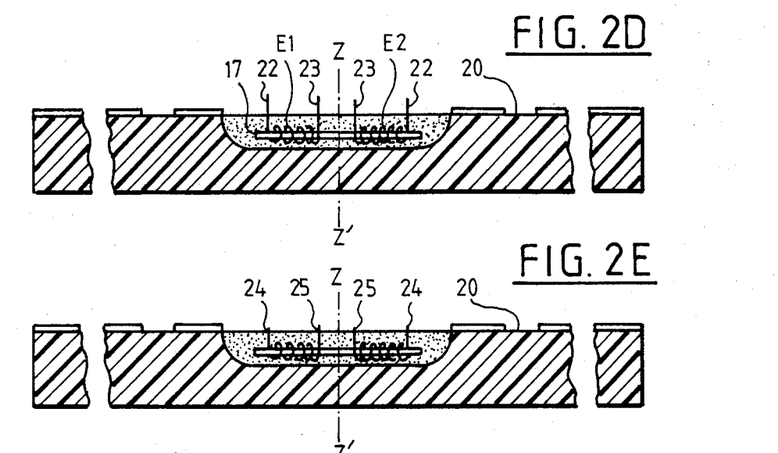

In each of the grooves of the wafer 59, a wire 17 of soft magnetic material, provided with two windings E1 and E2, is put in place as shown in FIG. 2D; this wire is analogous to that shown in FIG. 1A. It is assumed in the example described that the length of each wire 17 is practically equal to six millimeters. These wires are placed in the grooves 18-1, 18-2, ..., 18-p of the wafer 59, such that the two windings E1 and E2 of the same wire occupy symmetrical positions with respect to the plane of symmetry extending along the axis TT'; the tracing of this plane is indicated in FIGS. 2C–2F by the line ZZ'. Under these conditions, all the windings E1 of these wires are in alignment along a direction parallel to this plane. Moreover, placing the magnetic wires 17 in the grooves 18-1, 18-2, ..., 18-p is effected such that the non-wound portions 22 and 23 of the wire that has formed each of these windings protrudes above the face 20 of the wafer 59.

The placement in the grooves 18-1, 18-2, ..., 18-p of the magnetic wires 17 provided with their windings may be done manually, or preferably by means of a suitable insertion machine. When this placement has been completed, these grooves are filled up with the aid of a hardenable insulating substance, which may be that mentioned above. After this substance has hardened, the face 20 of the wafer 59 is subjected to a precision grinding operation on its portion included between the two groups 129-1 and 129-2 of printed circuits, with the effect that the portions of the conductors 22 and 23 that protrude beyond this face are severed, causing contact dots 24 and 25 to appear on this face; these dots comprise the ends of the windings embedded in the hardened substance. The appearance of the wafer 59 is now as shown in section in FIG. 2E.

When this operation is completed, the wafer 59 is subjected to electric monitoring to verify that the electric conductors comprising the windings are functioning properly.

Figure 2F:
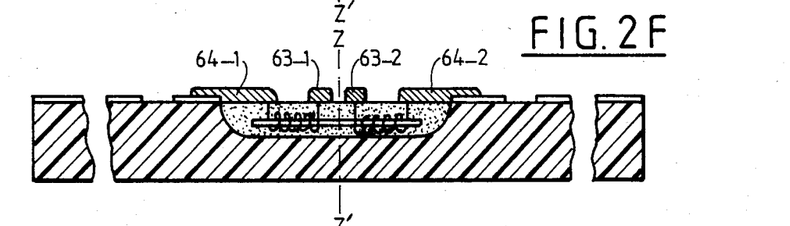
Figure 2G:
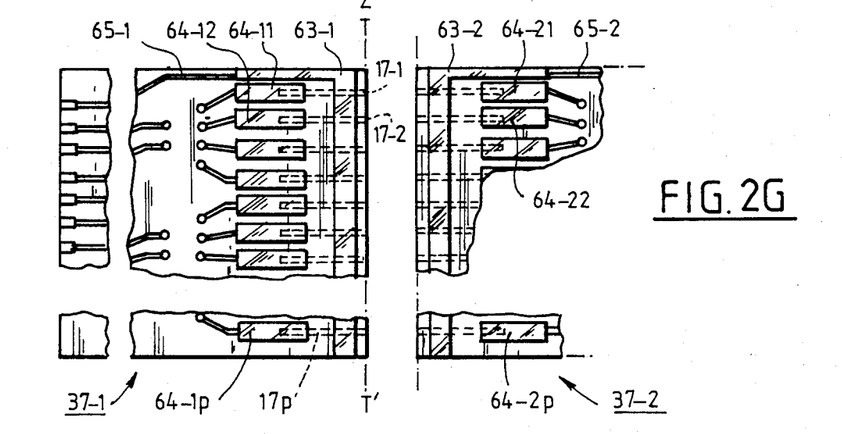
Figure 5:
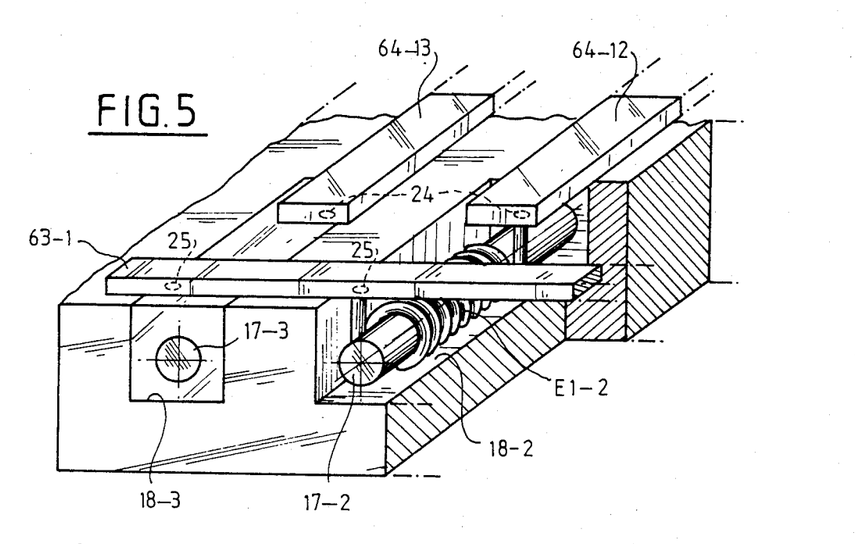
FIG. 5 is a view on a larger scale showing a detail of the embodiment of the connections made in the course of the phase shown in FIG. 2F.

After that, as will be understood from FIGS. 2F, 2G and 5, the various electrical connections are made, which enable the conductive strips 61-1, 61-2 and the conductors 65-1 and 65-2 to be connected to the contact dots 24 and 25. Thus the p contact dots 24 located on the left of the plane of symmetry extending along the axes ZZ' and TT' in FIGS. 2F and 2G are each embodied by one of the p conductive strips 61-1, via one of the p metal conductor bars, these bars being identified as 64-11, 64-12, . . . , 64-1p in FIGS. 2G and 5. The p contact dots 25 located on the left of this plane are all connected with one another and with the conductor 65-1 by the intermediary of a metal bar 63-1. Similarly, the p contact dots 24 located on the right of this plane of symmetry are each connected respectively to one of the p conductive bands 61-2 by the intermediary of one of the p electric conductor bars, which are identified in FIG. 2G as 64-21, 64-22, . . . , 64-2p. Finally, the p contact dots 25 located on the right of this plane are all connected to one another and to the conductor 65-2 by the intermediary of a metal conductor bar 63-2. In the example described, all the bars 63-1, 63-2, 64-11, 64-12, . . . , 64-1p, 64-21, 64-22, . . . , 64-2p are formed by deposition of a metal film in the desired areas, by using known techniques such as high-frequency cathodic sputtering, or electron-gun evaporation.

Figure 2H:
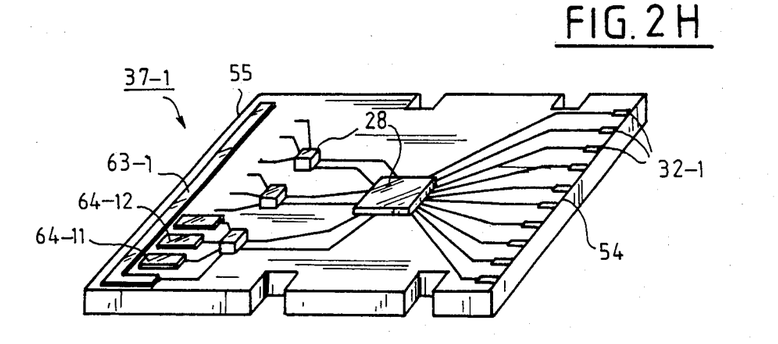

When all the connections have been made, the wafer 59 is severed along its plane of symmetry, which makes it possible as shown in FIG. 2G to obtain two units 37-1 and 37-2 which are then completed by mounting electronic components 28 on each of the groups of printed circuits 129-1 and 129-2. One of these completed units, 37-1, has been shown in FIG. 2H. In FIG. 2H, reference numeral 54 identifies the edge of the unit 37-1 along which the contact zones 32-1 are arranged, and 55 is the edge of this unit opposed to this edge 54; the edge 55 results from the severing of the wafer 59 along the plane of symmetry.

The assembly operations that are now done are analogous to those described above with reference to FIGS. 1I, 1J and 6. These operations accordingly do not need to be described in detail here. It is merely noted that in the example described, where the object is to produce a transducer capable of forming punctiform magnetized zones on a recording substrate spaced apart by an interval of 106 μm, two units analogous to those shown in FIG. 2H are used, these two units 37-1 and 37-2 being placed back to back such that the magnetic cores of the unit 37-1 are offset by one-half of a spacing interval with respect to the cores of the unit 37-2. The necessary electrical connections among the contact zones 32-1 and 32-2 of these two units and the connection terminals 39 of a connecctor 40 of the type shown in FIG. 1I are then made. Then two rigid caps 41 and 42 are place on both sides of the assembly thereby obtained, and they are fixed integrally to one another by fixation elements. After two shoes 48 and 49 are mounted on these two caps. the entire assembly is locked such as to obtain a rigid and non-deformable module, which is then subjected to duplicate molding and to a precision grinding operation before being put into place in the data recording equipment.

Although the description and the accompanying drawings relate to preferred embodiments of the inventoin, it will be understood that the invention encompasses any means that are technologically equivalent to those described and shown, taken in isolation or in combination and applied within the scope of the invention defined by the following claims. For example, the conductor wires 36, which in the example shown in FIG. 1H are used to effect the electrical connections between the contact zones of the card 27 and the contact dots of the block 19-1, may be replaced by metal bars analogous to those shown in FIG. 2G.

I claim:

1. A method for producing a magnetic transducer adapted for recording and/or reading data on a magnetic substrate (12), this transducer including at least one row of p magnetic heads (T1, T2, T3, etc.), each of these heads comprising an elongated magnetic core provided with an exciting winding, this method comprising:

providing at least one support block (such as 19-1) of nonmagnetic material, having a series of p grooves (18-1, 18-2, . . . , 18-p) on one of its faces (20), each of said grooves having dimensions sufficient to permit accommodating in it a magnetic core provided with its winding, this method further being characterized by the steps of:

forming at least one winding (such as E1-1) of insulated conductor wire on each magnetic core (such as 17-1) such that each winding has two non-wound portions (22, 23), in addition to its wound portion;

placing each of the cores so provided (17-1, 17-2, . . . , 17-p) into each of said grooves (18-1, 18-2, . . . , 18-p), such that the non-wound portions (22, 23) of said conductor wires project above said face (20);

completely filling said grooves provided with these cores with the aid of a hardenable nonmagnetic substance;

precision grinding said face (20), after hardening of this substance, such as to sever said portions (22, 23) of said conductors projecting above said face and thus causing contact dots (24, 25) to appear, comprising the ends of the windings (E1-1, E1-2, . . . , E1-p) embedded in this hardened substance, these contact dots being intended for permitting connection of these windings with an electrical control circuit (11).

2. A method according to claim 1, characterized in that each magnetic core (such as 17-1) is obtained by severing a wire (17) of soft magnetic material, provided with n windings (E1, E2, . . . , En) distributed at regular intervals over the length of this wire, into n portions.

3. A method according to claim 1 wherein the magnetic transducer includes K support blocks (19-1, 19-2, . . , 19-K), K being an integer at least equal to two, each of these support blocks is obtained by cutting a wafer (19) of nonmagnetic material provided on its face (20) with p grooves (18-1, 18-2, . . . , 18-p), this cutting being performed in a direction (XX') perpendicular to said grooves.

4. A method according to claim 2 wherein the magnetic transducer includes K support blocks (19-1, 19-2, . . , 19-K), K being an integer at least equal to two, each of these support blocks is obtained by cutting a wafer (19) of nonmagnetic material provided on its face (20) with p grooves (18-1, 18-2, . . . , 18-p), this cutting being performed in a direction (XX') perpendicular to said grooves.

5. A method according to claim 3, characterized in that the cutting of the wafer (19) is performed only after the operation of precision grinding of said face (20) has been completed.

6. A method according to claim 1 wherein it furthermore comprises the steps of:

fixing each support block (such as 19-1) against an edge (33) of a card (27) equipped with a printed circuit (29) and with components (28) that are part of the electrical control circuit (11), this printed circuit being configured such as to have contact zones (30, 31) along said edge (33):

and connecting these contact zones (30, 31) to said contact dots (24, 25).

7. A method according to claim 1 wherein the contact dots (24, 25) are distributed in a first series of p dots (24) such that each of them comprises one of the two ends of each winding, and in a second series of p dots (25) such that each of them comprises the other end of each winding, the method further comprises the steps of:

fixing each support block (such as 19-1) against an edge (33) of a card equipped with a printed circuit (28) and with components (28) that are part of the electrical control circuit (11), said printed circuit being configured so as to have along said edge (33) a first series of p contact zones (30) and a second series of p contact zones (31);

connecting each of the dots of the first series (24) respectively to each of the contact zones of the first series (30);

and connecting each of the dots of the second series (25) respectively to each of the contact zones of the second series (31).

8. A method according to claim 1, characterized in that given that the magnetic transducer includes two support blocks (59-1, 59-2), each of these support blocks is obtained by slicing a wafer (59) of insulating material provided on one (20) of its faces with the series of p edges (18-1, 18-2, ..., 18-p), these grooves being parallel to one another and arranged such that each of them has as its axis of symmetry a median axis (TT') of said wafer (59), this axis being perpendicular to the direction of the grooves, each groove being dimensioned so as to permit the accommodation there of one wire (17) of soft magnetic material provided with two windings (E1, E2), this slicing being effected along said median axis (TT').

9. A method according to claim 8, wherein the contact dots (24, 25) are distributed in each support block in a first series of p dots (24) such that each of them comprises one of the two ends of each winding and in a second series of p dots (25) such that each of them comprises the other end of each winding, and given that the wafer (59) is equipped with two groups of printed circuits (129-1, 129-2) located on both sides of the median axis (TT'), each group including conductors forming p conductive strips (61-1 or 61-2), each extending facing each of the p grooves (18-1, 18-2, ..., 18-p) and one conductor, called the reverse conductor (65-1 or 65-2) and intended to assure the reversing of the excitation current of the various windings, the method further comprises the steps of:

connecting in each group each of the p conductive strips (for example, 61-1) respectively to each of the p dots of the first series (24) which is located on the same side as this group with respect to the median axis (TT'); and connecting in each group the return conductor (for example, 65-1) in this group to all the p dots of the second series (25) that is located on the same side as this group with respect to the median axis (TT').

10. A method according to claim 6 wherein the connections made so as to connect the dots to the electrical control circuit are embodied by means of conductor wires (36).

11. A method according to claim 7 wherein the connections made so as to connect the dots to the electrical control circuit are embodied by means of conductor wires (36).

12. A method according to claim 9 wherein the connections made so as to connect the dots to the electrical control circuit are embodied by means of conductor wires (36).

13. A method according to claim 6 wherein the connections made so as to connect the contact dots to the electrical control circuit are embodied by means of metal conductor bars (63, 64).

14. A method according to claim 7 wherein the connections made so as to connect the contact dots to the electrical control circuit are embodied by means of metal conductor bars (63, 64).

15. A method according to claim 9 wherein the connections made so as to connect the contact dots to the electrical control circuit are embodied by means of metal conductor bars (63, 64).

16. A method according to claim 15, characterized in that the metal bars are formed by metal deposition, using the technique of cathodic sputtering.

* * * * *